United States Patent [19]
Cook

[11] Patent Number: 5,758,683
[45] Date of Patent: Jun. 2, 1998

[54] ON/OFF CIRCUIT FOR A HYDRAULIC SYSTEM

[75] Inventor: John S. Cook, Madras, Oreg.

[73] Assignee: Raymond Keith Foster, Madras, Oreg.

[21] Appl. No.: 592,127

[22] Filed: Jan. 26, 1996

[51] Int. Cl.$^6$ ................................................. F16K 31/14
[52] U.S. Cl. ........................ 137/115.26; 137/115.23; 137/509; 137/869; 137/885; 251/25
[58] Field of Search ..................... 137/115.23, 115.26, 137/509, 869, 885; 251/25

[56] References Cited

U.S. PATENT DOCUMENTS

| | | | |
|---|---|---|---|
| 3,311,130 | 3/1967 | Caldwell | 137/869 |
| 3,590,868 | 7/1971 | Pontiggia | 137/869 |
| 5,375,619 | 12/1994 | Foster | 137/115 |
| 5,427,229 | 6/1995 | Foster | 198/750.7 |

FOREIGN PATENT DOCUMENTS 0143089  3/1985  European Pat. Off. ............... 137/885

*Primary Examiner*—Stephen M. Hepperle
*Attorney, Agent, or Firm*—Joan H. Pauly

[57] ABSTRACT

An on/off, protective circuit has a pressure line with an inlet for connection to a pressure source and an outlet for connection to the pressure port of a hydraulic system, such as a reciprocating conveyor. A relief valve is spring biased into a closed position and openable by pressure in the pressure line to short circuit pressure from the pressure line to a return line when an on/off valve is in an off position. The spring biasing of the relief valve causes residual pressure in the pressure line. To prevent communication of the residual pressure out through the pressure outlet and into the hydraulic system and thereby prevent creeping movement in the system, a check valve is provided in the pressure line downstream of the relief valve. The check valve has a valve plug positioned to be closed by pressure in the pressure line. The check valve also has a pilot chamber which is supplied with pressure when the on/off valve is in an on position to open the check valve and allow pressure to be supplied to the hydraulic system. When the on/off valve is in its off position, the pilot chamber of the check valve is connected to return to allow the residual pressure in the pressure line and a biasing spring to maintain the check valve closed.

6 Claims, 6 Drawing Sheets

ON/OFF CIRCUIT FOR A HYDRAULIC SYSTEM

TECHNICAL FIELD

This invention relates to on/off circuits for hydraulic systems and, more particularly, to such a circuit having an on/off valve, a relief valve spring biased into a closed position and openable by pressure in a pressure line to short circuit pressure from the pressure line to a return line when the on/off valve is in an off position, and a check valve in the pressure line biased closed by residual pressure in the pressure line when the relief valve is open to prevent communication of residual pressure to the hydraulic system.

BACKGROUND INFORMATION

In various types of hydraulic systems, such as hydraulically powered reciprocating floor conveyors, the pressure port of the hydraulic system is commonly connected to a source of hydraulic pressure at all times. In order to permit the system to be turned off, an on/off circuit is positioned between the pressure port and the pressure source. Desirably, the on/off circuit also performs the function of protecting the hydraulic system against inadvertent reversed connection of the circuit's pressure inlet and return outlet ports to tank and pressure. On/off, protective circuits for use with reciprocating floor conveyors are disclosed in my U.S. Pat. No. 5,375,619, granted Dec. 27, 1994, and No. 5,427, 229, granted Jun. 27, 1995. A problem has arisen in connection with the use of the type of circuit disclosed in those two patents. This problem is creeping or slight movement of the conveyor when the on/off valve is in an off position.

FIG. 1 shows the type of protective circuit that is disclosed in U.S. Pat. No. 5,375,619. Referring to FIG. 1, the circuit has a pressure inlet port $P_{in}$ for connection to a pressure source and a return outlet port $T_{out}$ for connection to tank. The circuit also includes a pressure outlet port $P_{out}$ for connection to the pressure port of the hydraulic system and a return inlet portion $T_{in}$ for connection to the return port of the hydraulic system. A pressure line 2 extends between the pressure inlet port $P_{in}$ and the pressure outlet port $P_{out}$. A return line 4 extends between the return inlet port $T_{in}$ and the return outlet port $T_{out}$.

The circuit includes a four-way, two-position on/off valve 10 having a first port 12, a second port 14, and a third port 16. Line 18 connects the first port 12 to the pressure line 2. Line 20 connects the second port 14 to the return line 4. A restrictor 22 is provided in line 18. A standard one-way check valve 24 is provided in line 20 to permit pressure flow from the second port 14 to the return line 4 but prevent pressure flow from the return line 4 to the second port 14. The on/off valve 10 has an off position in which the second port 14 is connected to the third port 16 and communication between the first port 12 and the third port 16 is blocked. This off position is shown in FIG. 1. The valve 10 also has an on position in which the first port 12 is connected to the third port 16 and communication between the second port 14 and third port 16 is blocked. The valve 10 is moved between its off and on positions manually or electrically.

Still referring to FIG. 1, the circuit includes a pilot-operated relief valve 26 positioned between the pressure line 2 and the return line 4. The relief valve 26 includes a valve chamber 28 and a pilot chamber 30. A piston 32 separates the valve chamber 28 from the pilot chamber 30. A valve stem 34 extends axially from the piston 32 into the valve chamber 28. A valve plug 36 is positioned in the valve chamber 28 on the outer end of the stem 34. A compression spring 38 in the pilot chamber 30 has one end urged against the piston 32 to exert a biasing force that biases the valve plug 36 into a seated position in which it closes an inlet 40 into the valve chamber 28. The inlet 40 is connected to the pressure line 2. The valve chamber 28 also has an outlet 42 that is connected to the return line 4. The pilot chamber 30 is connected to the third port 16 of the on/off valve 10 by means of line 44, 46.

The additional circuit elements shown in FIG. 1 include a standard relief valve 50 connected to the third port 16 of the on/off valve 10 by line 44, 48, standard check valve 52 and a filter assembly. The relief valve 50 is connected to the return line 4 by line 62 and operates in a known manner to relieve excess pressure in the circuit. The filter assembly includes a filter 54 through which flow through the pressure line 2 normally flows. A bypass check valve 56 is provided to allow the flow in pressure line 2 to bypass the filter 54 if the filter 54 becomes clogged or is defective. A bypass indicator 58 provides the operator with an indication of the filter bypass condition.

In the normal operation of the circuit, when the on/off valve 10 is in its off position shown in FIG. 1, the pilot chamber 30 of the pilot-operated relief valve 26 is connected to return through the third port 16 of the on/off valve 10. This permits pressure in pressure line 2 to act on the valve plug 36 and open the valve 26. The opened valve 26 short circuits pressure flow from the pressure line 2 to the return line 4. When the valve 10 is moved into its on position, the pilot chamber 30 of the relief valve 26 is connected to pressure via the third port 16. This pressure maintains the relief valve 26 in a closed condition to prevent short circuiting of pressure flow through the valve 26 from the pressure line 2 to the return line 4. The pressure from port 16 is effective to hold the valve 26 closed because of the biasing spring 38 and because of the greater surface area of the piston face in pilot chamber 38 on which the pressure acts in comparison to the surface area of the valve plug 36 on which pressure in the pressure line 2 acts.

The circuit shown in FIG. 1 functions as both an on/off circuit and a protective circuit. If the connections of the pressure inlet port $P_{in}$ and the return outlet port $T_{out}$ to a pressure source and to tank are inadvertently reversed when the on/off valve 10 is in its off position, pressure in return line 4 is short circuited to the pressure line 2 through the pilot-operated relief valve 26. The pressure in return line 4 is communicated to the valve chamber 28 of valve 26 through line 60. In the valve chamber 28, the pressure acts on both the face of the piston 32 opposite the pilot chamber 30 and the confronting face of the valve plug 36. Since the surface area of the piston 32 acted on by the pressure is much greater, the pressure in the valve chamber 28 moves the valve into its open position against the force of the spring 38 to allow pressure from line 60 to move through the valve chamber 28 into the pressure line 2 and from the pressure line 2 to tank. Opening of the valve 26 is permitted since connection of the third port 16 of the on/off valve 10 to the pressure in the return line 4 is blocked by check valve 24. Line 62 between return line 4 and relief valve 50 is blocked by relief valve 50. Any pressure build up in pilot chamber 30 due to movement of the piston 32 is released to tank through pressure line 2 via check valve 52.

When the connections are reversed and the on/off valve 10 is in its on position, pressure is still short circuited through pilot-operated relief valve 26 since the pilot chamber 30 is connected to return via third port 16, first port 12, and pressure line 2.

The circuit shown in FIG. 1 and described above is disclosed in more detail in U.S. Pat. No. 5,375,619. The disclosure relating thereto in such patent is incorporated herein by reference.

The present invention is an improvement in the type of circuit shown in FIG. 1 and relates to the problem of creeping movement referred to above. When the on/off valve 10 is in its off position, the pilot-operated relief valve 26 is opened by pressure in the pressure line 2. Since the pressure must overcome the force of the spring 38, residual pressure remains in pressure line 2 and is communicated to the hydraulic system through the pressure outlet port $P_{out}$. For example, a pressure of approximately fifty pounds per square inch may be required to overcome the biasing force of the spring 38 on the piston 32. This level of residual pressure is sufficient to cause the undesired creeping or slight movement of the conveyor.

SUMMARY OF THE INVENTION

The subject of the invention is an improved on/off circuit for a hydraulic system having a pressure port and a return port. According to an aspect of the invention, the circuit comprises a pressure inlet port for connection to a pressure source, a return outlet port for connection to tank, a pressure outlet port for connection to the pressure port of the hydraulic system, and a return inlet port for connection to the return port of the hydraulic system. A pressure line extends between the pressure inlet port and the pressure outlet port. A return line extends between the return inlet port and the return outlet port. The circuit includes an on/off valve having a first port connected to the pressure line at a first location, a second port connected to the return line, and a third port. The on/off valve has an off position in which the second port is connected to the third port and communication between the first and third ports is blocked, and an on position in which the first port is connected to the third port and communication between the second and third ports is blocked.

The circuit also includes a pilot-operated relief valve including a valve chamber having an inlet connected to the pressure line at a second location and an outlet connected to the return line, and a pilot chamber separated from the valve chamber by a piston. A valve plug is positioned in the valve chamber and is operatively connected to the piston. A spring is positioned to exert a biasing force that biases the valve plug into a seated position in which the valve plug closes the inlet to block communication between the pressure line and the return line through the valve chamber. The pilot chamber is connected to the third port of the on/off valve to allow pressure in the pilot chamber to maintain the valve plug in its seated position when the pressure inlet port and return outlet port are connected to a pressure source and to tank, respectively, and the on/off valve is in its on position, and to allow pressure acting on the valve plug to overcome the biasing force and unseat the valve plug and thereby connect the pressure line to the return line through the valve chamber when the pressure inlet port and return outlet port are connected to a pressure source and tank, respectively, and the on/off valve is in its off position.

The circuit further includes a pilot-operated check valve including a valve cavity through which the pressure line extends at a third location downstream of the first and second locations. An orifice separates the valve cavity into first and second portions. A piloting chamber is separated from the valve cavity by a piston member. A valve member is operatively connected to the piston member and positioned in the valve cavity to be urged by pressure in the pressure line upstream of the check valve into a seated position in which it closes the orifice to block the pressure line and thereby block the pressure outlet port. The piloting chamber is connected to the third port of the on/off valve to allow pressure in the piloting chamber to unseat the valve member and open communication between the pressure inlet port and the pressure outlet port when the on/off valve is in its on position and to allow the valve member to remain seated when the on/off valve is in its off position to prevent communication to the pressure outlet port of residual pressure in the pressure line caused by the biasing force in the pilot-operated relief valve.

A feature of the invention is that it may be constructed to be used in connection with two hydraulic systems. To provide this feature, the circuit may further comprise a second pressure outlet port for connection to the pressure port of a second hydraulic system. The on/off valve has a fourth port and a second on position in which the first port is connected to the fourth port and communication between the second and fourth ports is blocked. The fourth port is connected to the second port and blocked from communication with the first port when the on/off valve is in its off position. The circuit also includes a branch pressure line extending from the pressure line downstream of the first and second locations to the second pressure outlet port. A second pilot-operated check valve has a second valve cavity through which the branch pressure line extends. The second pilot-operated check valve has the same structure as the pilot-operated check valve described above. The valve member in the second check valve is urged by pressure in the pressure line upstream of the second check valve into a seated position in which it closes the valve's orifice to block the branch pressure line and thereby block the second pressure outlet port. The second valve's piloting chamber is connected to the fourth port of the on/off valve to allow pressure to unseat the valve member when the on/off valve is in its second on position and to allow the valve member to remain seated when the on/off valve is in its off position to prevent communication to the second pressure outlet port of residual pressure in the pressure line caused by the biasing force in the pilot-operated relief valve.

Preferably, each check valve has a valve stem interconnecting the valve member and the piston member. A seal is carried by the stem and separates a third portion of the valve cavity from the rest of the valve cavity. The third portion communicates with a face of the piston opposite the piloting chamber. In the second check valve, the third portion is connected to the third port of the on/off valve. In the other or first check valve, the third portion is connected to the fourth port of the on/off valve.

Also preferably, a circuit having two pilot-operated check valves further comprises a shuttle valve positioned between the pilot-operated relief valve and the on/off valve. The shuttle valve has first and second inlet ports communicating with the third and fourth ports of the on/off valve, respectively. A center passageway interconnects the first and second inlet ports. An outlet port is connected to the pilot chamber of the relief valve and communicates with the center passageway between the first and second inlet ports. A shuttle valve element is positioned in the center passageway and is freely movable into first and second opposite seated positions in which it closes communication between the outlet port and the first and second inlet ports, respectively. The shuttle valve element is movable by pressure in either one of the inlet ports to open communication between said one of the inlet ports and the outlet port, to supply pressure to the pilot chamber to maintain the valve plug of the relief valve in its closed position during normal operation of the hydraulic systems.

The circuit of the invention solves the problem of creeping or slight movement of a conveyor or other mechanism in a hydraulic system by blocking communication of residual pressure to the hydraulic system when the on/off valve in the circuit is in an off position. Since pressure is not supplied to the piloting chamber of the pilot-operated check valve or valves when the on/off valve is in its off position and since any residual pressure in the pressure line will tend to close the check valve or valves, the design of the present invention makes use of the residual pressure itself to prevent communication of the residual pressure to the hydraulic system.

These and other advantages and features will become apparent from the detailed description of the best modes for carrying out the invention that follows.

BRIEF DESCRIPTION OF THE DRAWINGS

In the drawings, like element designations refer to like parts throughout, and.

BEST MODES FOR CARRYING OUT THE INVENTION

FIGS. 2–6 show circuits and circuit elements that are constructed according to the invention and that constitute the best modes for carrying out the invention currently known to the applicant. The circuit of the invention is intended for use in a reciprocating floor conveyor, and particularly a conveyor of the type disclosed in my U.S. Pat. No. 5,375,619. However, it is intended to be understood that the circuit of the invention may also be used to advantage in connection with other types of hydraulic systems.

Figure 1:
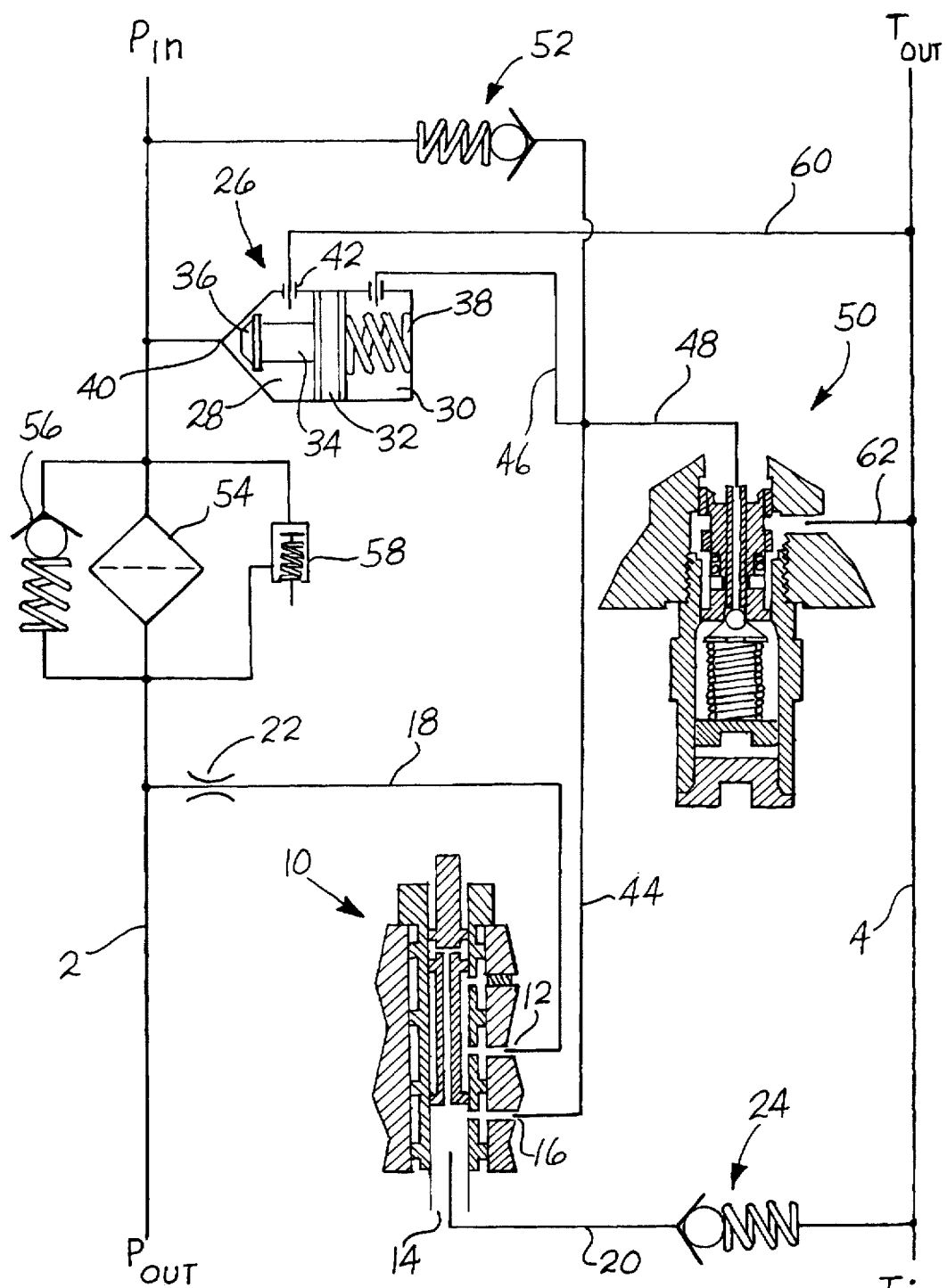
FIG. 1 is a schematic diagram of a prior art on/off protective circuit.

In FIGS. 2–5, elements of the circuit that are essentially the same as the elements in the prior art circuit shown in FIG. 1 are given the same reference numerals as in FIG. 1. Elements that are modified or that are not present in the prior art circuit are given new reference numerals.

Figure 2:
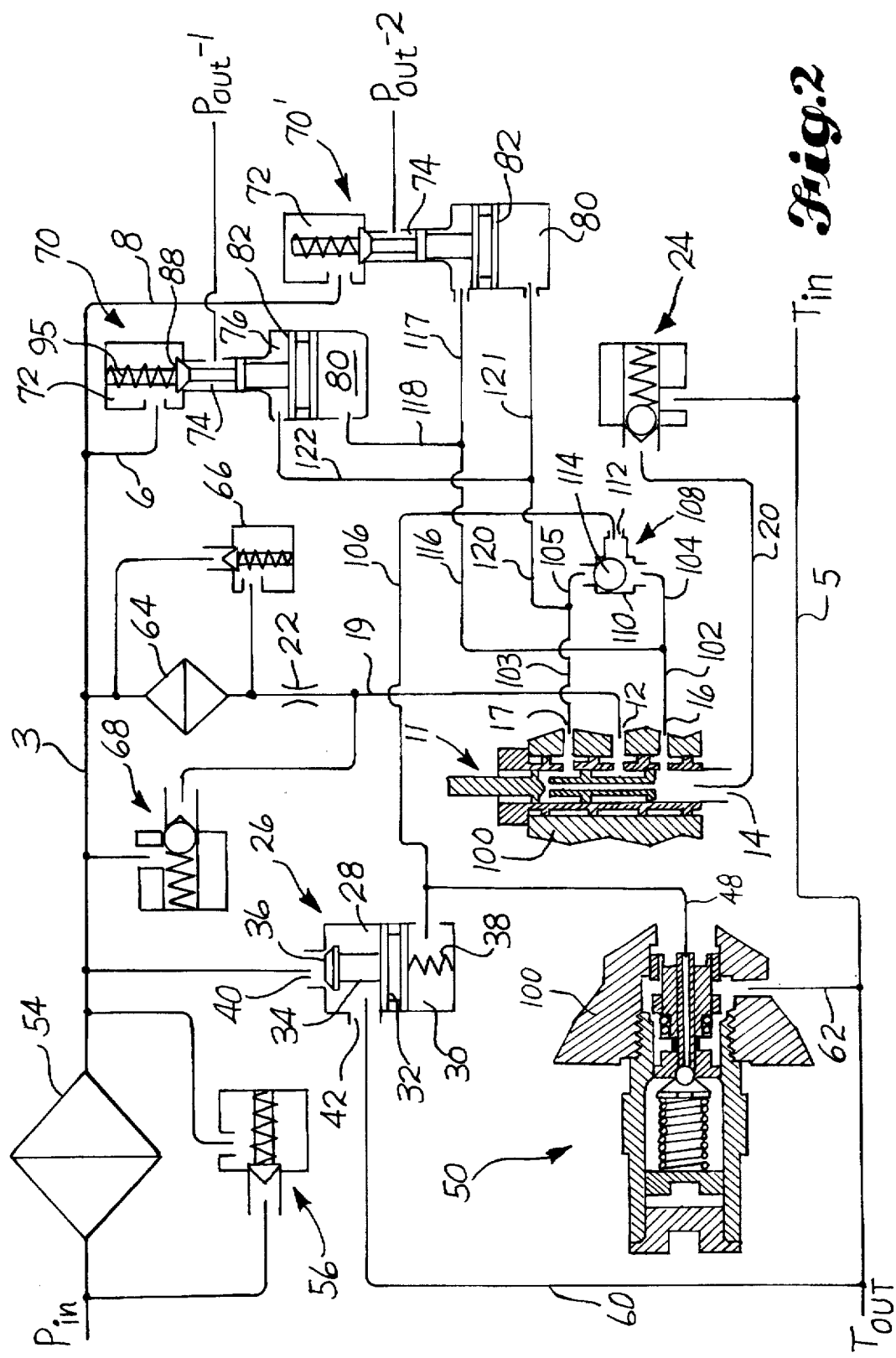
FIG. 2 is a schematic diagram of a first preferred embodiment of the circuit of the invention showing the on/off valve in an off position.
Figure 3:
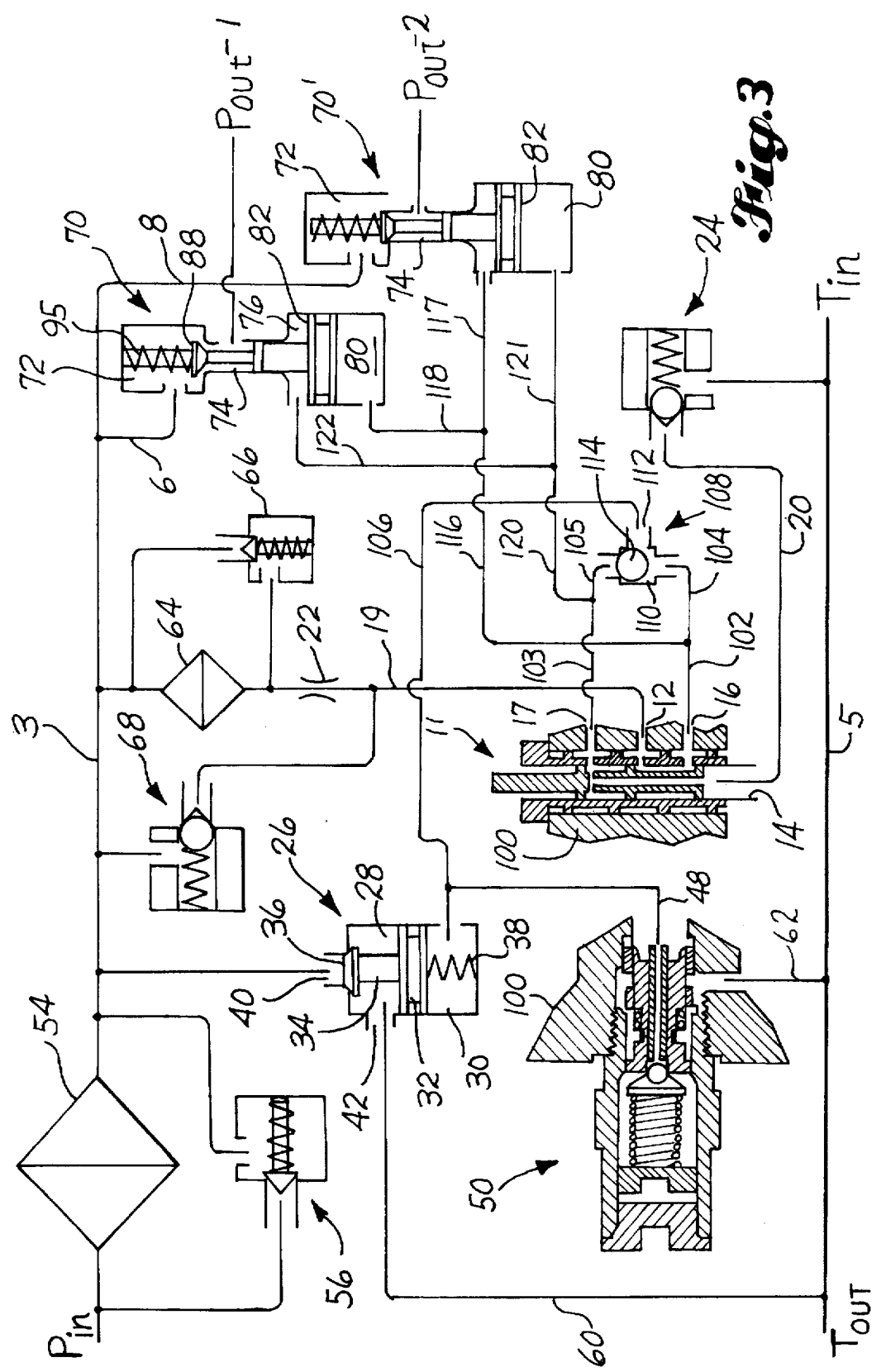
FIG. 3 is like FIG. 2 except that it shows the on/off valve in a first on position.
Figure 4:
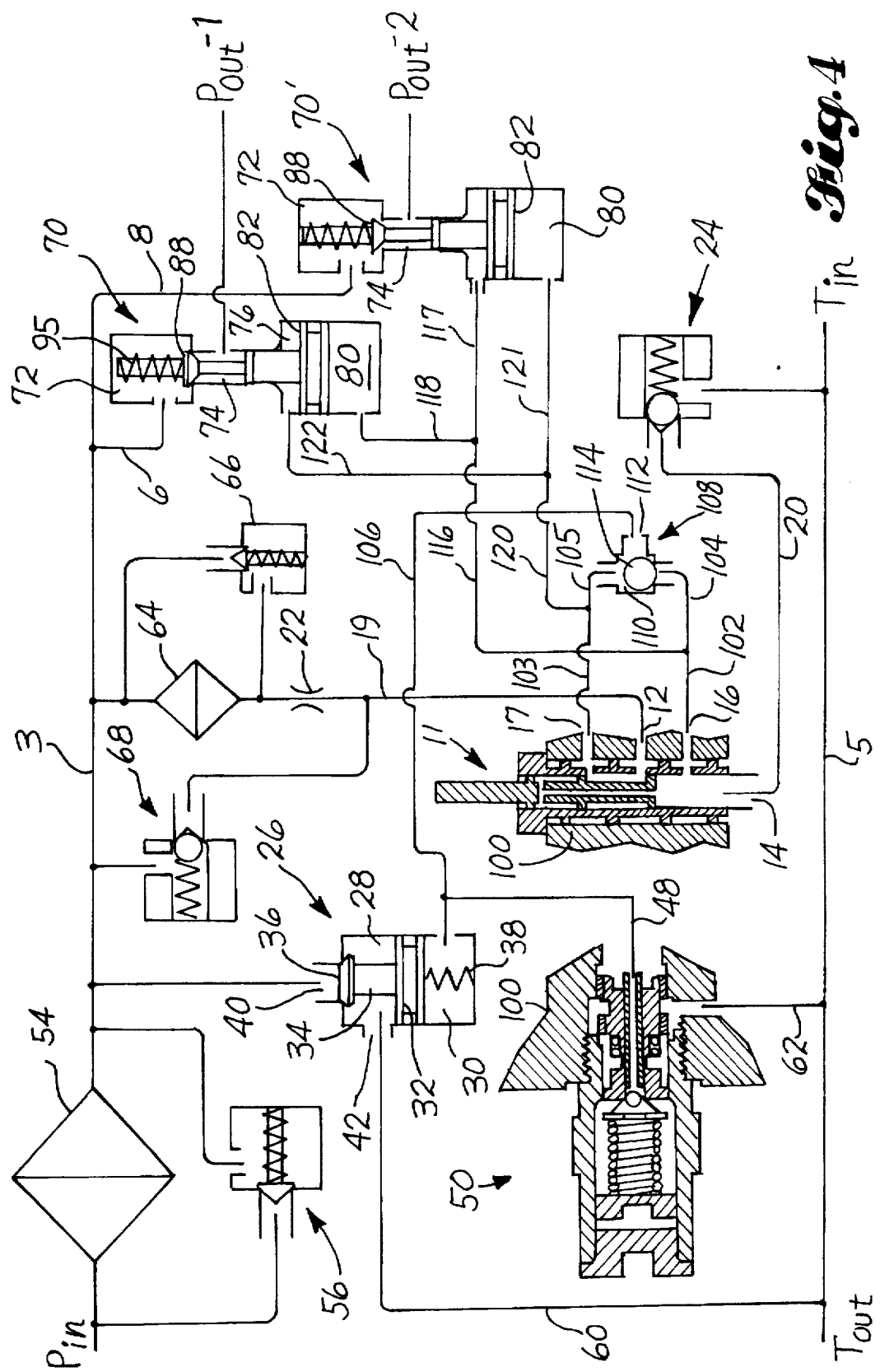
FIG. 4 is like FIGS. 2 and 3 except that it shows the on/off valve in a second on position.

Referring to FIGS. 2–4, the first preferred embodiment of the invention has a pressure line 3 the end portion of which is denoted by the reference numeral 6. A branch pressure line 8 branches off from the pressure line 3 at the upstream end of the end portion 6 of the pressure line 3. As used herein, "downstream" refers to the direction extending from the pressure inlet port $P_{in}$ toward the end portion 6 and the branch pressure line 8, and "upstream" refers to the opposite direction. The circuit also includes a return line 5 extending, as in FIG. 1, between the return outlet port $T_{out}$ to the return inlet port $T_{in}$. The return inlet port $T_{in}$ is preferably provided with a Y-connector (not shown) to connect the return inlet port $T_{in}$ to the return port of each of two hydraulic systems.

The pressure ports of the hydraulic systems are connected to first and second pressure outlet ports $P_{out}$-1, $P_{out}$-2, respectively.

Figure 7:
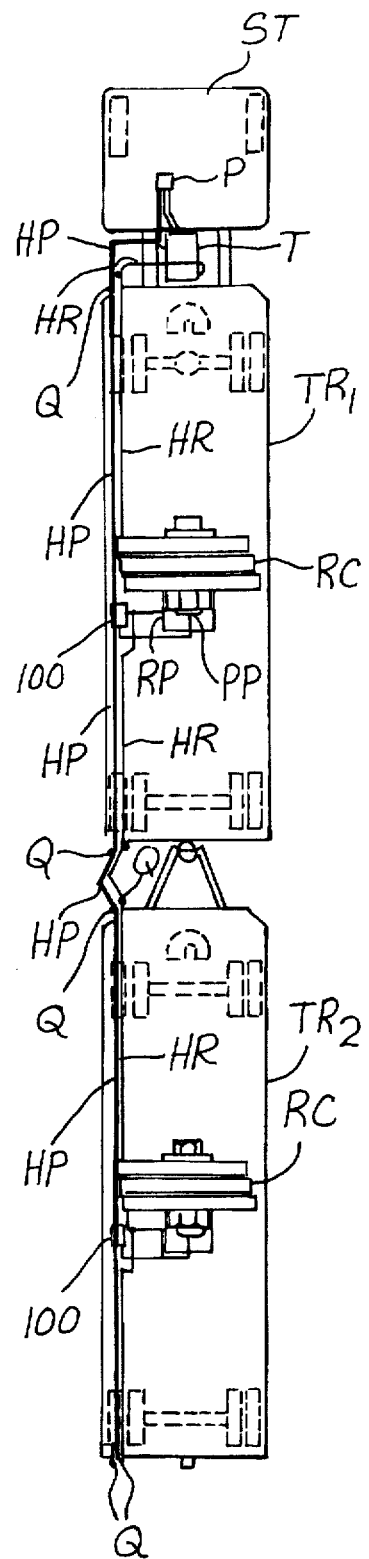
FIG. 7 is a schematic plan view of a tandem tractor/trailer on which the first preferred embodiment is installed.

In the embodiment shown in FIGS. 2–4, the circuit is designed to be used in connection with two hydraulic systems. For example, a common arrangement is a semitractor ST having two trailers $TR_1$, $TR_2$ connected thereto. This arrangement is illustrated in FIG. 7. Each of the trailers $TR_1$, $TR_2$ may be provided with a reciprocating floor conveyor RC. In such a situation, each of the trailers $TR_1$, $TR_2$ is preferably provided with the protective circuit shown in FIGS. 2–4. The respective circuit is preferably housed in a control block 100 that is mounted on the trailer $TR_1$, $TR_2$. The valves and other elements of the circuit may be positioned in or formed by bores in the block body 100, preferably with portions of the valve bodies being formed by the block body 100. With a protective circuit mounted on each trailer $TR_1$, $TR_2$ the circuits can be easily hooked up regardless of which trailer is positioned forward of the other trailer. The pressure inlet port $P_{in}$ and return outlet port $T_{out}$ of the circuit on the forward trailer $TR_1$ are connected to the pressure source (pump P) and reservoir tank T carried by the semitractor ST. The first and second pressure outlet ports $P_{out}$-1, $P_{out}$-2 of the circuit are connected to the pressure port PP of the conveyor RC installed in the forward trailer $TR_1$ and the pressure inlet port $P_{in}$ of the circuit on the rear trailer $TR_2$, respectively. The return inlet port $T_{in}$ is connected to the return port RP of the conveyor RC in the forward trailer $TR_1$ and the return outlet port $T_{out}$ of the circuit on the rear trailer $TR_2$. The connections are made by means of pressure hoses HP and return hoses HR. The hoses are coupled by means of quick connect couplings Q.

This arrangement protects the conveyor hydraulic system in each of the trailers $TR_1$, $TR_2$ from inadvertent reversed connections and from undesirable creeping movement. It also permits either conveyor RC to be easily operated. The embodiment of the circuit shown in FIGS. 2–4 is not intended to permit simultaneous operation of the two conveyors RC.

Still referring to FIGS. 2–4, the first preferred embodiment includes an on/off valve 11 similar to the on/off valve 10 shown in FIG. 1. The main difference between the two valves 10, 11 is that the valve 11 shown in FIGS. 2–4 has a fourth port 17. The opening for this fourth port in FIG. 1 is blocked off by a plug since a fourth port was not required in the circuit shown in FIG. 1. Referring to FIGS. 2–4, the first port 12 is connected to the pressure line 3 by a line 19 that intersects the pressure line 3 at a first upstream location. Like the line 18 in FIG. 1, this line 19 includes a restrictor 22. The line 19 is modified in that it includes a filter assembly having a filter 64 and a filter bypass valve 66 that operate in the same manner as the filter 54 and bypass valve 56 described above. A check valve 68 is provided in a bypass passage to permit pressure flow from line 19 to pressure line 3 to bypass the filter 64 and the restrictor 22. The second port 14 of the on/off valve 11 is connected to the return line 5 by line 20 in which a check valve 24 is positioned.

A primary feature of the invention is the provision in the circuit of one or more pilot-operated check valves. In the embodiment shown in FIGS. 2–4, there are two check valves 70, 70', which are essentially identical. In the embodiment shown in FIG. 5, there is a single check valve 70. FIG. 6 shows the structure of the check valve 70 in greater detail.

Referring to FIG. 6, the valve 70 has a valve cavity having a first portion 72, a second portion 74, and a third portion 76. An orifice 78 separates the first and second portions 72, 74.

A pilot chamber 80, also referred to herein as a "piloting chamber", is separated from the valve cavity 72, 74, 76 by a piston 82. A valve stem 84 extends axially from the piston 82 into the valve cavity 72, 74, 76. A piston-like seal 86 is carried by the stem 84 and sealingly separates the third portion 76 of the cavity from the rest of the cavity and, more specifically, from the second portion 74 of the cavity. The third portion 76 is also sealingly separated from the pilot chamber 80 by the piston 82 and communicates with the face of the piston 82 opposite the pilot chamber 80. The outer end of the stem 84 carries a valve member or valve plug 88. The valve plug 88 is positioned in the first portion 72 of the valve cavity and has a seated position, shown in FIG. 6, in which it closes the orifice 78 to close communication between the first and second portions 72, 74 of the cavity. This closes communication between an inlet port 90 communicating with the first portion 72 and an outlet port 92 communicating with the second portion 74. The valve 70 also has a pilot port 93 communicating with the pilot chamber 80 and a port 94 communicating with the third portion 76 of the cavity. The valve plug 88 is biased into its seated position by a spring 95 which engages the plug 88 and is guided by an axial extension 96 of the stem 84.

In the circuit shown in FIGS. 2–4, the downstream end portion 6 of the pressure line 3 extends through the valve cavity of the first check valve 70 from the inlet port 90 to the outlet port 92, and the branch pressure line 8 similarly extends through the valve cavity of the second check valve 70'. The pressure lines 3, 6, 8 extend through the valve cavities at locations downstream of the locations at which the relief valve 26 and the on/off valve 11 are connected to the pressure line 3.

As stated above, the circuit is preferably housed in a control block with portions of the block body providing portions of the valve housings. As shown in FIG. 6, the housing of check valve 70 is provided by the block body 100, with the valve cavity 72, 74, 76 and pilot chamber 80 being formed by bores in the body 100. A first plug 98 closes one end of the valve cavity and provides an abutment and guide for the spring 95. A second plug 99 closes the pilot chamber end of the valve 70.

Referring to FIGS. 2–4, in the first preferred embodiment, the third port 16 of the on/off valve 11 is connected to the pilot chamber 30 of the pilot-operated relief valve 26 by line 102, 104, 106. The fourth port 17 is connected to the pilot chamber 30 by line 103, 105, 106. A shuttle valve 108 is positioned between the on/off valve 11 and the relief valve 26. The shuttle valve has a structure and function similar to the shuttle valve disclosed in my U.S. Pat. No. 5,427,229. The disclosure of the shuttle valve in that patent is incorporated herein by reference.

Still referring to FIGS. 2–4, the shuttle valve 108 has a first inlet port at which the line 102, 104 from the third port 16 of the on/off valve 11 terminates, and a second inlet port at which the line 103, 105 from the fourth port 17 of the on/off valve 11 terminates. In other words, lines 104, 105 extend from lines 102, 103, respectively, to the inlet ports of the shuttle valve 108 to connect the third and fourth ports 16, 17 of the on/off valve 11 to the first and second inlet ports of the shuttle valve 108. The shuttle valve 108 has a center passageway 110 that interconnects the first and second inlet ports, and an outlet port 112 that communicates with the center passageway 110 between the first and second inlet ports. The outlet port 112 is connected to the pilot chamber 30 of the relief valve 26 via line 106. A shuttle valve element in the form of a ball 114 is positioned in the center passageway 110 and is freely movable into first and second opposite seated positions in which it closes communication between the outlet port 112 and the first and second inlet ports, respectively. The ball 114 is movable by pressure in either one of the inlet ports to open communication with said one of the inlet ports and the outlet port 112. This supplies pressure to the pilot chamber 30 of the relief valve 26 to maintain the relief valve plug 36 in its closed position during normal operation of the conveyors or other hydraulic systems with which the circuit is being used.

The on/off valve 11 has an off position shown in FIG. 2, a first on position shown in FIG. 3, and a second on position shown in FIG. 4. In the off position, both the third port 16 and the fourth port 17 are connected to return via second port 14. The first port 12 is blocked. In the first on position shown in FIG. 4, the third port 16 is connected to the first port 12 to connect the third port 16 to pressure. Communication between the second and third ports 14, 16 is blocked. Fourth port 17 remains connected to return through second port 14. In the second on position shown in FIG. 5, the fourth port 17 is connected to the first port 12 to connect the fourth port 17 to pressure. Communication between the second port 14 and the fourth port 17 is blocked. The third port 16 is connected to return through the second port 14.

The third and fourth ports 16, 17 of the on/off valve 11 are connected to the pilot-operated check valves 70, 70' to control operation of the check valves 70, 70'. The pilot chamber 80 of the first check valve 70 is connected to the third port 16 by line 102, 116, 118. The third portion 76 of the valve cavity of check valve 70 is connected to fourth port 17 by line 103, 120, 122. The pilot chamber 80 of the second pilot-operated check valve 70' is connected to the fourth port 17 by line 103, 120, 121. The third portion 76 of the valve cavity of the check valve 70' is connected to the third port 16 by line 102, 116, 117.

Figure 5:
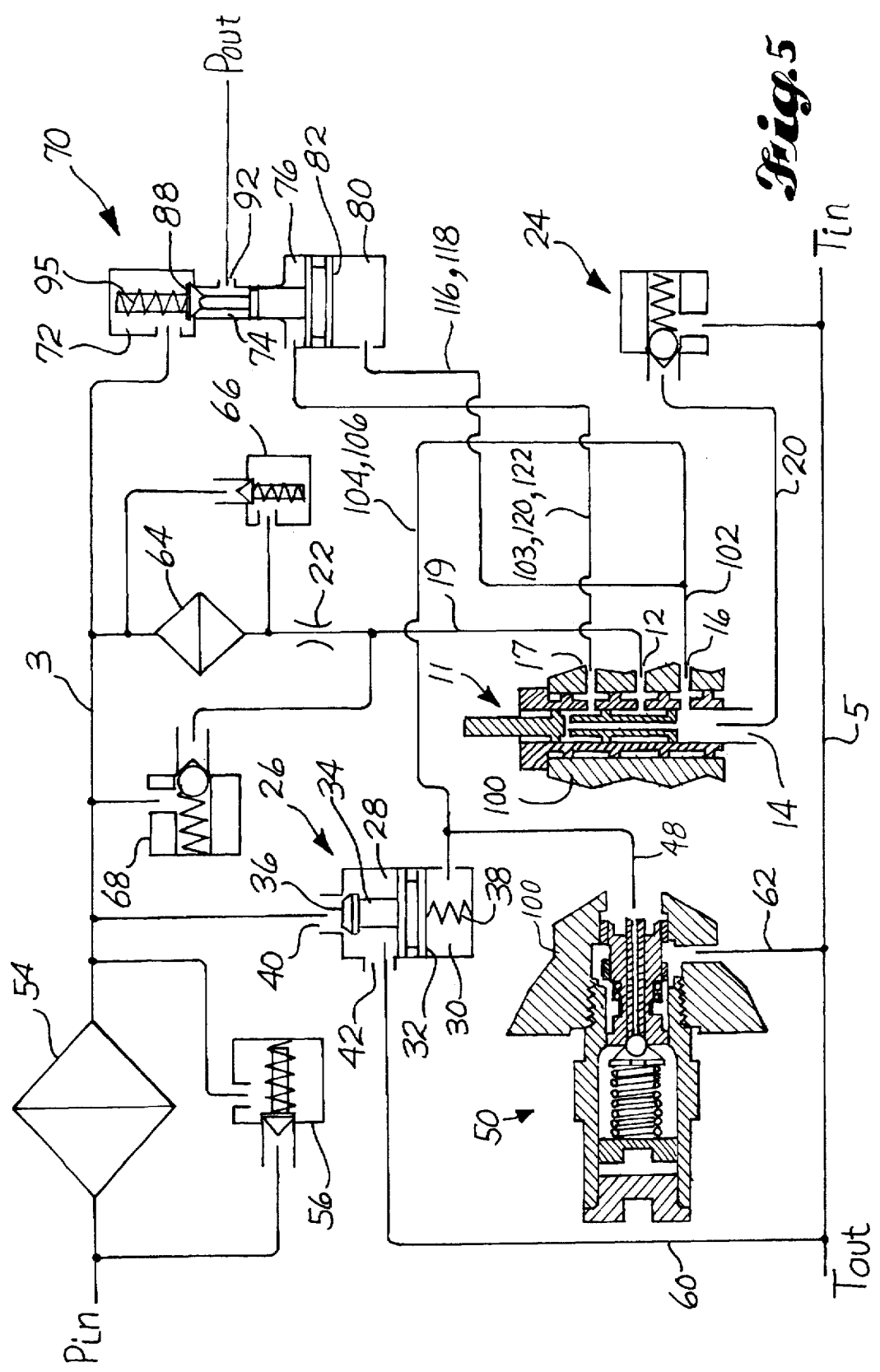
FIG. 5 is a schematic diagram like FIG. 2 showing a second preferred embodiment of the circuit of the invention.
Figure 6:
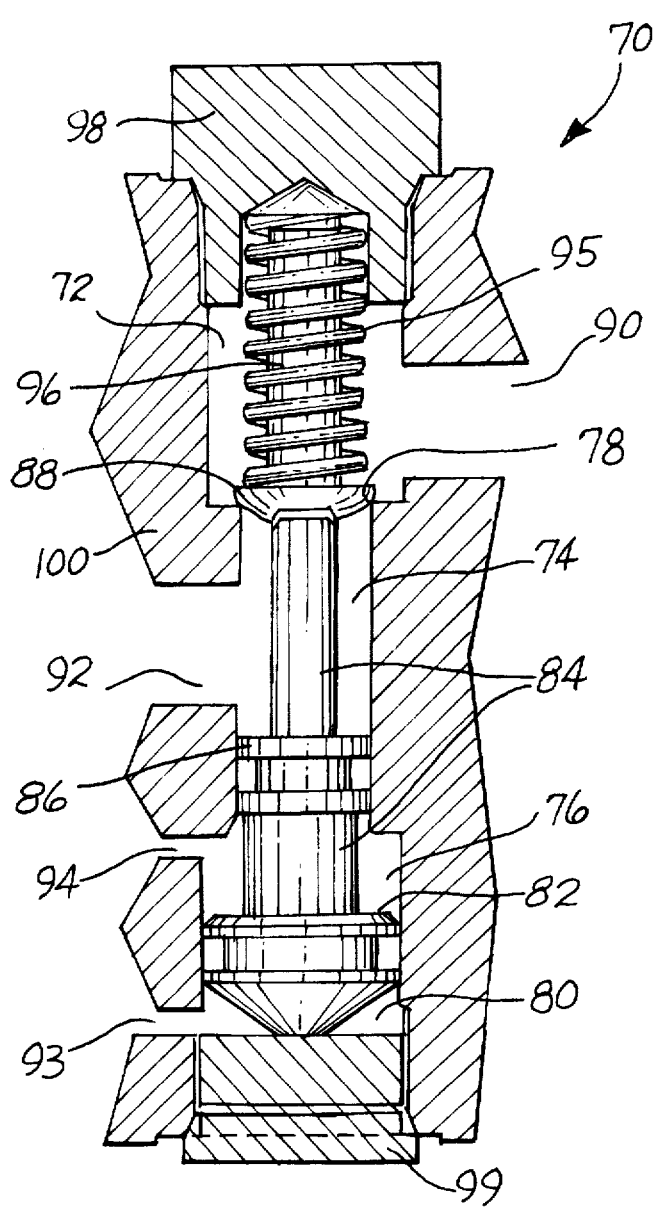
FIG. 6 is a sectional view of the preferred embodiment of the pilot-operated check valve of the invention, with parts shown in elevation.

FIG. 5 shows a second preferred embodiment of the invention. This embodiment is similar to the embodiment shown in FIGS. 2–4. The main difference is that the circuit includes a single pilot-operated check valve 70 and circuit elements rendered unnecessary by the omission of the second pilot-operated check valve are also omitted. The omitted elements include the shuttle valve and the lines leading into and out from the second pilot-operated check valve. The second embodiment could also be constructed by modifying the first embodiment shown in FIGS. 2–4. The required modifications include removal of the ball valve element 114 from the shuttle valve 108 and blocking of the lines 117, 121 leading to the second pilot-operated check valve 70'.

In the second embodiment, the on/off valve has only two useful positions, the on position shown in FIG. 3 and the off position shown in FIG. 2. The operation of the two embodiments when the on/off valve 11 is in either of these two positions is the same except for the absence of the functioning of the shuttle valve and the second pilot-operated check valve in the second embodiment.

Referring to FIG. 3, when the on/off valve 11 is in its first on position, pressure is communicated from the third port 16 of the on/off valve 11 to the pilot chamber 80 of the first pilot-operated check valve 70. The third portion 76 of the valve cavity is connected to return via the fourth port 17. The pressure in the pilot chamber 80 opens the valve 70 to allow pressure to flow freely through the pressure line 3 from the pressure inlet port $P_{in}$ through the valve 70 and out through the first pressure outlet port $P_{out}$-1. Pressure in the third port 16 also flows through the shuttle valve 108 and into the pilot chamber 30 of the relief valve 26 to maintain the relief valve 26 in a closed position. The pilot chamber 80 and the third cavity portion 76 of the second check valve 70' are connected to return and pressure, respectively, through fourth and third ports 17, 16, respectively. This allows the pressure in branch pressure line 8 upstream of the valve 70' to maintain the valve 70' in a closed position. The circuit operates normally in this manner until an operator changes the position of the on/off valve 11.

When the on/off valve 11 is in the second on position illustrated in FIG. 4, the connection of the third and fourth ports 16, 17 to pressure and return are reversed so that the first check valve 70 is maintained in a closed position and the second check valve 70' is opened by pressure in its pilot chamber 80. This blocks the first pressure outlet port $P_{out}$-1 and allows pressure to flow freely out through the second pressure outlet port $P_{out}$-2. Pressure is also supplied to the pilot chamber 30 of relief valve 26 from the fourth port 17 of the on/off valve 11 to maintain the relief valve 26 in its closed position.

Referring to FIG. 2, when the on/off valve 11 is in its off position, the pilot chamber 30 of the relief valve 26 is connected to return through the on/off valve 11, second port 14, and return line 5. This allows pressure in pressure line 3 to open the relief valve 26 to short circuit pressure from the pressure line 3 to the return line 5. As discussed above, the problem addressed by the present invention is the presence of residual pressure in pressure line 3 due to the need to overcome the biasing force of the spring 38 in relief valve 26. This problem is solved by the first and second pilot-operated check valves 70, 70', which prevent communication of the residual pressure to the hydraulic systems by blocking the pressure outlet ports $P_{out}$-1, $P_{out}$-2. In the closed position of the on/off valve 11, each of the valve's third and fourth ports 16, 17 is connected to return via the second port 14. This connects the pilot chambers 80 of each of the check valves 70, 70' to return. The third portions 76 of the valve cavities are also connected to return. In this situation, the residual pressure in pressure line 3 upstream of the valves 70, 70' and the springs 95 act on the valve plugs 88 of the valves 70, 70' to maintain the valve plugs 88 in their seated positions. The seating of the valve plugs 88 blocks the pressure lines 3, 6, 8 to thereby block the pressure outlet ports $P_{out}$-1, $P_{out}$-2 and prevent communication of pressure to the hydraulic systems.

The operation of the circuit of the invention described above is the normal operation thereof when the pressure inlet port $P_{in}$ and the return outlet port $T_{out}$ are correctly connected to a pressure source and to tank, respectively. The circuit also performs the protective function described above and in my U.S. Pat. No. 5,375,619. The functioning of the circuit of the invention in its protective mode is similar to the protective functioning of the circuit disclosed in the patent. When a reverse connection occurs with the on/off valve 11 in its off position shown in FIG. 2, pressure from return line 5 is blocked from communication with second port 14 by the check valve 24 in line 20. Relief valve 50 blocks line 62 extending from return line 5. Pressure from return line 5 is communicated through line 60 to the valve chamber 28 of the relief valve 26. This opens relief valve 26, as described above. Hydraulic fluid from pilot chamber 30 can escape through lines 106, 104, 116, 118 and 106, 105, 120, 121 into the pilot chambers 80 of the pilot-operated check valves 70, 70', which are free to open since their first valve cavity portions 72 are connected to return via pressure line 3. When the on/off valve 11 is in either of its on positions, the pilot chamber 30 of relief valve 26 is connected to return via third port 16 or fourth port 17 of on/off valve 11, first port 12, line 19, check valve 68, and pressure line 3. The opening of the check valves 70, 70' when the connections have been inadvertently reversed, regardless of the position of the on/off valve 11, is not a problem since the opening of the check valves 70, 70' can only connect the pressure ports of the hydraulic systems to return.

Although the preferred embodiments of the invention have been illustrated and described herein, it is intended to be understood by those skilled in the art that various modifications and omissions in form and detail may be made without departing from the spirit and scope of the invention as defined by the following claims.

What is claimed is:

1. An on/off circuit for a hydraulic system having a pressure port and a return port, comprising:

a pressure inlet port for connection to a pressure source;

a return outlet port for connection to tank;

a pressure outlet port for connection to the pressure port of the hydraulic system;

a return inlet port for connection to the return port of the hydraulic system;

a pressure line extending between the pressure inlet port and the pressure outlet port;

a return line extending between the return inlet port and the return outlet port;

an on/off valve having a first port connected to the pressure line at a first location, a second port connected to the return line, and a third port; said on/off valve having an off position in which the second port is connected to the third port and communication between the first port and the third port is blocked, and an on position in which the first port is connected to the third port and communication between the second port and the third port is blocked;

a pilot-operated relief valve including a valve chamber having an inlet connected to the pressure line at a second location and an outlet connected to the return line, a pilot chamber separated from the valve chamber by a piston, a valve plug positioned in the valve chamber and operatively connected to the piston, and a spring positioned to exert a biasing force that biases the valve plug into a seated position in which the valve plug closes the inlet to block communication between the pressure line and the return line through the valve chamber; said pilot chamber being connected to the third port of the on/off valve to allow pressure in the pilot chamber to maintain the valve plug in its seated position when the pressure inlet port is connected to a pressure source, the return outlet port is connected to tank, and the on/off valve is in its on position, and to allow pressure acting on the valve plug to overcome the biasing force and unseat the valve plug and thereby connect the pressure line to the return line through the valve chamber when the pressure inlet port is connected to a pressure source, the return outlet port is connected to tank, and the on/off valve is in its off position; and a pilot-operated check valve including a valve cavity through which the pressure line extends at a third location downstream of said first and second locations, an orifice separating the valve cavity into first and second portions, a piloting chamber separated from the valve cavity by a piston member, and a valve member operatively connected to the piston member and positioned in the valve cavity to be urged by pressure in the pressure line upstream of the check valve into a seated position in which it closes said orifice to block the pressure line and thereby block the pressure outlet port; said piloting chamber being connected to the third port of the on/off valve to allow pressure in the piloting chamber to unseat the valve member and open communication between the pressure inlet port and the pressure outlet port when the on/off valve is in its on position and to allow the valve member to remain seated when the on/off valve is in its off position to prevent communication to the pressure outlet port of residual pressure in the pressure line caused by the biasing force in the pilot-operated relief valve.

2. The circuit of claim 1, wherein the circuit further comprises a second pressure outlet port for connection to the pressure port of a second hydraulic system; the on/off valve has a fourth port and a second on position in which the first port is connected to the fourth port and communication between the second port and the fourth port is blocked, said fourth port being connected to the second port and blocked from communication with the first port when the on/off valve is in its off position; the circuit includes a branch pressure line extending from the pressure line downstream of said first and second locations to the second pressure outlet port; and the circuit further comprises a second pilot-operated check valve including a second valve cavity through which the branch pressure line extends, a second orifice separating the second valve cavity into first and second portions, a second piloting chamber separated from the second valve cavity by a second piston member, and a second valve member operatively connected to the second piston member and positioned in the second valve cavity to be urged by pressure in the pressure line upstream of the second check valve into a seated position in which it closes said second orifice to block the branch pressure line and thereby block the second pressure outlet port; said second piloting chamber being connected to the fourth port of the on/off valve to allow pressure in the second piloting chamber to unseat the second valve member and open communication between the pressure inlet port and the second pressure outlet port when the on/off valve is in its second on position and to allow the second valve member to remain seated when the on/off valve is in its off position to prevent communication to the second pressure outlet port of residual pressure in the pressure line caused by the biasing force in the pilot-operated relief valve.

3. The circuit of claim 2, wherein each check valve has a valve stem interconnecting the valve member and the piston member, and a seal carried by the stem and separating a third portion of the valve cavity from the rest of the valve cavity, said third portion communicating with a face of the piston member opposite the piloting chamber; and wherein, in the second check valve, the third portion is connected to the third port of the on/off valve, and in the other check valve, the third portion is connected to the fourth port of the on/off valve.

4. The circuit of claim 3, further comprising a shuttle valve positioned between the relief valve and the on/off valve; said shuttle valve having first and second inlet ports communicating with said third and fourth ports of the on/off valve, respectively, a center passageway interconnecting said first and second inlet ports, an outlet port connected to the pilot chamber of the relief valve and communicating with said center passageway between said first and second inlet ports, and a shuttle valve element positioned in said center passageway and freely movable into first and second opposite seated positions in which it closes communication between said outlet port and said first and second inlet ports, respectively; said shuttle valve element being movable by pressure in either one of said inlet ports to open communication between said one of said inlet ports and said outlet port, to supply pressure to said pilot chamber to maintain said valve plug in its closed position during normal operation of the hydraulic systems.

5. The circuit of claim 2, further comprising a shuttle valve positioned between the relief valve and the on/off valve; said shuttle valve having first and second inlet ports communicating with said third and fourth ports of the on/off valve, respectively, a center passageway interconnecting said first and second inlet ports, an outlet port connected to the pilot chamber of the relief valve and communicating with said center passageway between said first and second inlet ports, and a shuttle valve element positioned in said center passageway and freely movable into first and second opposite seated positions in which it closes communication between said outlet port and said first and second inlet ports, respectively; said shuttle valve element being movable by pressure in either one of said inlet ports to open communication between said one of said inlet ports and said outlet port, to supply pressure to said pilot chamber to maintain said valve plug in its closed position during normal operation of the hydraulic systems.

6. The circuit of claim 1, wherein the check valve has a valve stem interconnecting the valve member and the piston member, and a seal carried by the stem and separating a third portion of the valve cavity from the rest of the valve cavity, said third portion communicating with a face of the piston member opposite the piloting chamber; and wherein the on/off valve has a fourth port that is connected to the second port and to said third portion when the on/off valve is in its on position.

* * * * *